United States Patent [19]

Kurono et al.

[11] Patent Number: 4,951,426
[45] Date of Patent: Aug. 28, 1990

[54] GRINDING FLUID FEEDER APPARATUS

[75] Inventors: Hidehiro Kurono; Yoshihiro Ikeda; Katsumi Nakayama; Seiichi Sasaki, all of Sayama, Japan

[73] Assignee: Honda Giken Kogyo Kabushiki Kaisha, Tokyo, Japan

[21] Appl. No.: 390,303

[22] Filed: Aug. 7, 1989

[30] Foreign Application Priority Data

Aug. 11, 1988 [JP] Japan .................................. 63-198883

[51] Int. Cl.$^5$ .............................................. B24B 55/02
[52] U.S. Cl. ........................................ 51/267; 407/135
[58] Field of Search ................... 51/267, 266, DIG. 1, 51/105 GG, 123 G; 409/135, 136, 27, 29

[56] References Cited

U.S. PATENT DOCUMENTS 4,528,779 7/1985 Wiener ................................... 51/267

FOREIGN PATENT DOCUMENTS

3115959A1 11/1982 Fed. Rep. of Germany .

Primary Examiner—Roscoe V. Parker
Attorney, Agent, or Firm—Armstrong, Nikaido, Marmelstein, Kubovcik & Murray

[57] ABSTRACT

A grinding fluid feeder apparatus for a grinding machine for machining a spiral bevel gear in which a tapered annular grinding portion is formed of conical grinding faces provided on the inner and outer circumferences of an annular grinding wheel and a tooth surface of a workpiece is ground by said conical grinding faces. The feeder apparatus includes a feeder block having a groove portion allowing the annular grinding portion to sink thereinto and a sump provided on a side surface of the groove portion, a grinding fluid feed passage communicating with the groove portion, and a cover plate provided at one of the openings of the groove portion on an end surface of the feeder block so as to abut on the annular grinding portion. The feeder block is disposed to have the other of the openings of the groove portion abut on a tooth space of the workpiece.

3 Claims, 4 Drawing Sheets

GRINDING FLUID FEEDER APPARATUS

BACKGROUND OF THE INVENTION

This invention relates to a grinding fluid feeder apparatus for use in a grinding operation in which the tooth surfaces of a spiral bevel gear are ground.

A grinding fluid feeding method generally used in a conventional grinding machine of this kind is such that a grinding fluid or oil is sprayed from outside of the grinding wheel through a nozzle onto the workpiece. Another known method as disclosed by, for example, the Japanese Unexamined Patent Application Publication Tokkaisho No. 59-19246 is such that, as shown in FIG. 5, a grinding fluid c is fed through a nozzle d into a recess portion b of a grinding wheel a so as to let the fluid flow out onto a portion of a workpiece to be ground.

In either of the above prior art methods, the grinding fluid can easily fly or scatter outwardly with the centrifugal force of rotation of the grind stone or grinding wheel, or by wind pressure from that rotation, so that the quantity of the fluid reaching the portion being ground is relatively smaller as compared with the actually supplied quantity thereof. This often results in such disadvantages as a grinding scorch on the workpiece and/or a shorter service life of the grinding wheel.

The present invention has for its object to provide a grinding fluid feeder apparatus capable of overcoming the foregoing disadvantages and thereby stabilizing quality of a workpiece ground and performance of a grinding wheel.

SUMMARY OF THE INVENTION

A means provided according to the present invention has solved the foregoing problem by concentratedly feeding the grinding fluid onto a portion where a grinding operation is being applied. In a grinding machine for machining a spiral bevel gear in which a tapered annular grinding portion is formed of conical grinding faces provided on the inner and outer circumferences of an annular grinding wheel and a tooth surface of a workpiece is ground by the conical grinding faces, a grinding fluid feeder apparatus according to the present invention comprises a feeder block having a groove portion allowing the annular grinding portion to sink thereinto and a sump provided on a side surface of the groove portion, a grinding fluid feed passage communicating with the groove portion, and a cover plate provided at one of the openings of the groove on an end surface of the feeder block so as to abut on the annular grinding portion, wherein the feeder block is disposed to have the other of the openings of the groove portion abut on a tooth space of the workpiece.

In the grinding fluid feeder apparatus arranged as described above, grinding fluid supplied through the communicating passage fills up the interiors of the groove portion and the sump and is fed into the tooth space of the workpiece as the grinding wheel rotates, so that the fluid can perform the functions of cooling and lubricating the grinding and ground surfaces and of removing chips out. The grinding fluid is fed into the interior of the groove portion including the sump in such a manner as to avoid shortage of the fluid there and further minimize flying or scattering outwardly of the fluid.

In addition, since a clearance formed in the groove portion is sealed with the cover plate, leakage of the fluid and pulling in of air possible with rotation of the grinding wheel are prevented.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
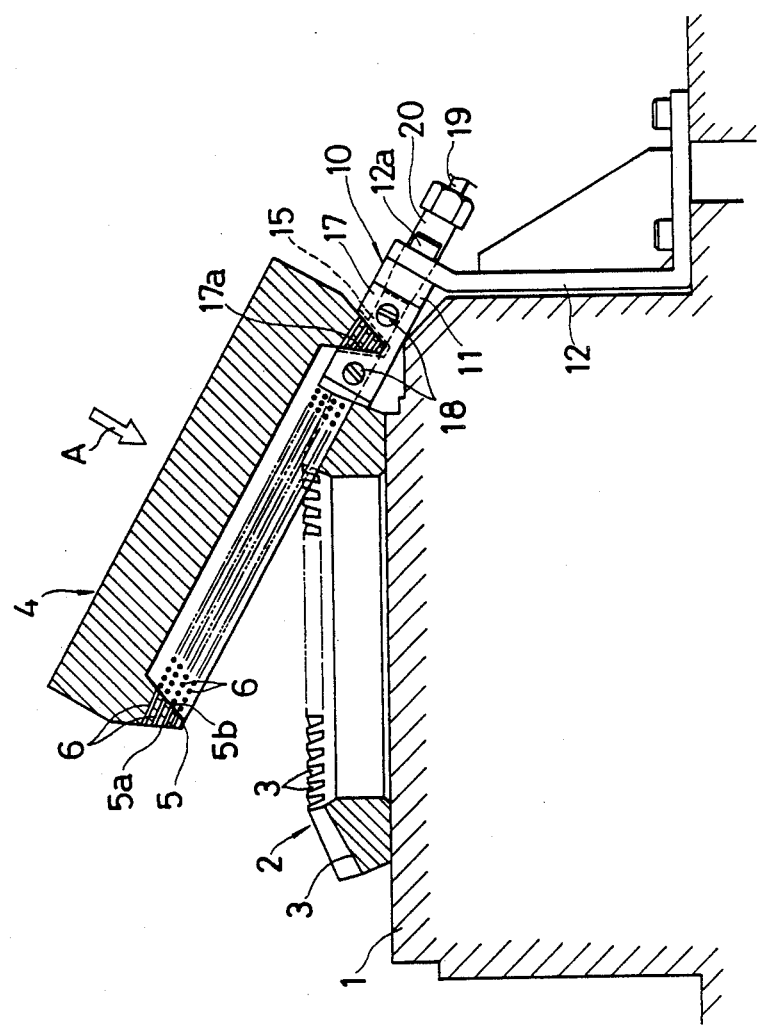
FIG. 1 is a longitudinal sectional view of an embodiment of this invention.
Figure 2:
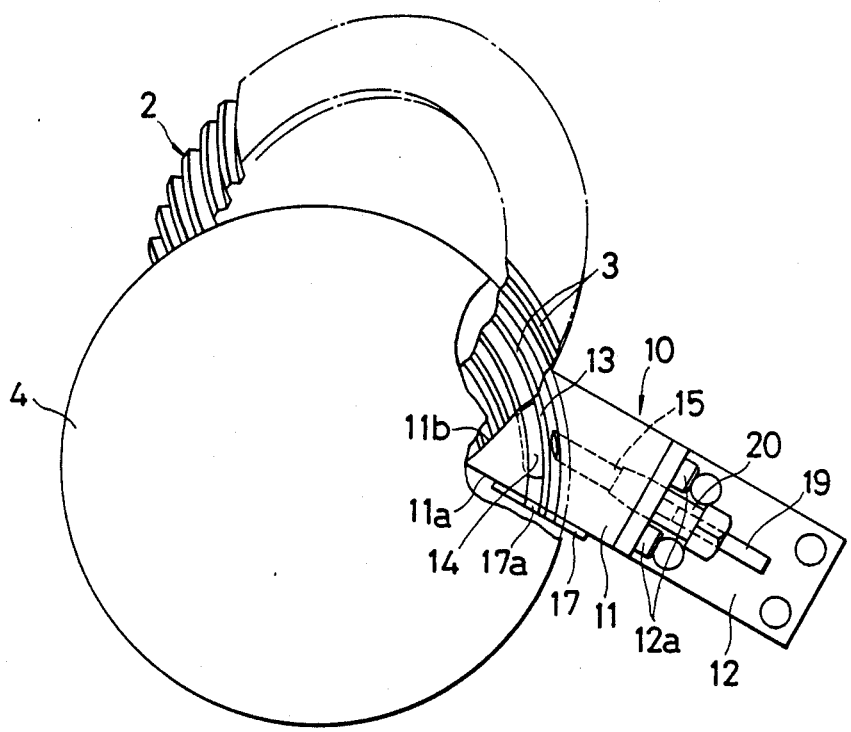
FIG. 2 is a view thereof as seen from the direction indicated by an arrow in FIG. 1.
Figure 3A:
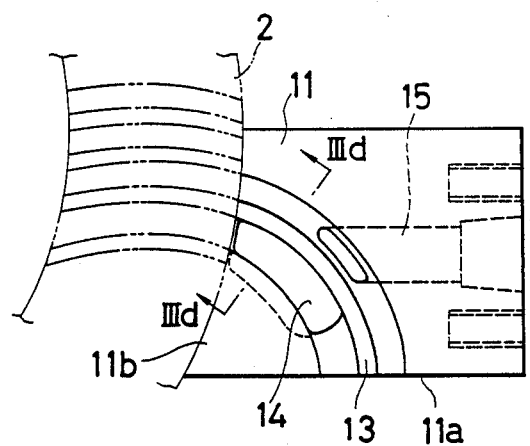
FIG. 3(a) is a top plan view of the feeder block.
Figure 3B:
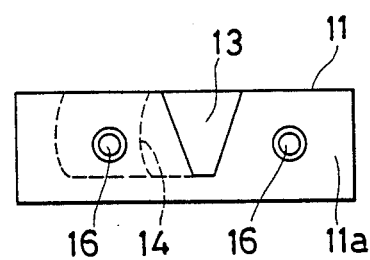
FIG. 3(b) is a front view thereof.
Figure 3C:
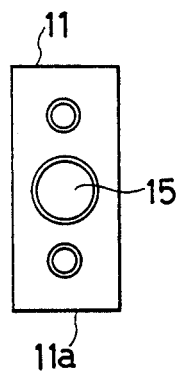
FIG. 3(c) is a side view thereof.
Figure 3D:
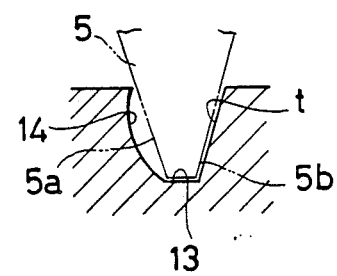
FIG. 3(d) is a sectional view taken along the line III$d$-III$d$ in FIG. 3(a)

FIG. 1 of the accompanying drawings is a longitudinal sectional view of a grinding fluid feeder apparatus according to the present invention and FIG. 2 is a view thereof as seen from the direction indicated by an arrow A in FIG. 1. Referring to these drawings, a work-clamping jig 1 has mounted thereon a spiral bevel gear constituting a workpiece in this example which has tooth spaces 3. An annular grinding wheel 4 is provided with a tapered annular grinding portion 5 having outer and inner conical grinding faces 5a and 5b and a number of oil holes 6, 6 . . . perforated therein.

This grinding fluid feeder apparatus 10 of the present invention for a grinding machine has a feeder block 11 which is securely attached to the jig 1 by a bracket 12 and a screw 12a.

Figure 4A:
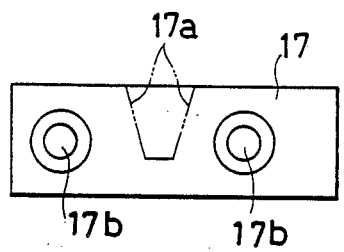
FIGS. 4(a and 4(b) are a front view of the cover plate and a side view thereof, respectively.
Figure 4B:
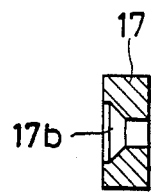
Figure 5:
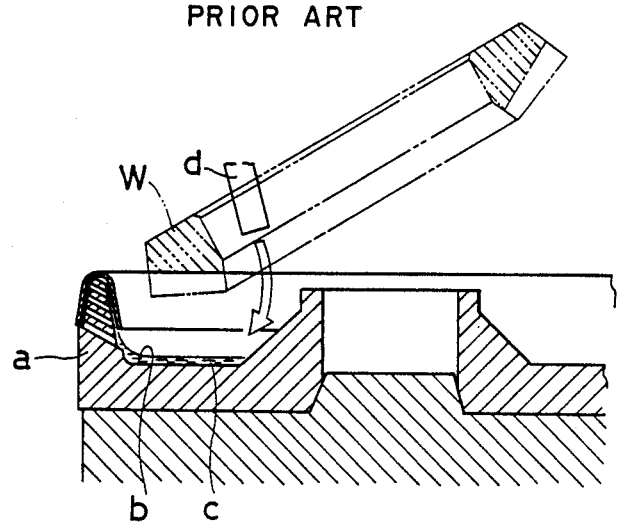
FIG. 5 is a longitudinal sectional view of a conventional apparatus.

As shown in FIG. 3(a) through FIG. 3(d), the feeder block 11 is provided with an arcuate, V-shaped groove 13. As clearly indicated in FIG. 3(d), this groove 13 has a width such that a clearance t is left with respect to each of the conical grinding faces 5a and 5b of the annular grinding portion 5 and further has a sump 14 formed in a portion of the side wall surface thereof. A feed passage 15 is bored in an appropriate location in the feeder block 11 so as to constantly feed a grinding fluid. Screw holes 16, 16 for attaching a cover are provided on one side surface 11a of the feeder block 11 and used to attach a cover plate 17 with screws 18 as shown in FIG. 4(a). After being attached as above, the cover plate 17 having holes 17b, 17b which are aligned to the screw holes 16, 16 is ground by means of the annular grinding portions 5 so as to be provided with a sealing portion 17a which seals the clearance t in such a manner that it remains abutting on the grinding portion 5. On the other hand, there is formed on the other side surface of the feeder block 11 in which the groove portion 13 opens an arcuate portion 11b that will come into contact with an outer circumferential surface of the workpiece 2.

A pipe 19 is connected to the feed passage 15 by a joint 20 and grinding fluid is thus fed into the passage through the pipe from a suitable source of fluid supply.

The grinding fluid feeder apparatus according to the present invention is arranged as described in the foregoing, so that during a grinding operation the grinding fluid flows into the clearance t and the sump 14 to lubricate the surface of the annular grinding portion 5 of the grinding wheel 4 as it flows along that surface, and further flows into the oil hole's 6 to be carried over into the tooth spaces of the workpiece, thereby carrying out such functions as cooling, lubrication, and removal of chips. During this operation the grinding fluid is fed sufficiently so as to not only fully fill the clearance t but also the sump 14 with the fluid, so that there can occur no shortage of the grinding fluid in the machine or no flying or scattering outwardly of the fluid therearound. Furthermore, since the clearance t is sealed at one opening of the groove portion 13 by the cover plate, possible leakage of the grinding fluid and pulling-in of air are prevented.

As described in the foregoing, according to the present invention, there is no flying or scattering outwardly of the fluid, so that consumption quantity of the fluid is minimized and the grinding fluid feeder apparatus and the cover device to prevent the fluid from scattering outwardly can be made compact and simple. In addition, since the annular grinding portion of the grinding wheel is supplied sufficiently with the grinding fluid kept in the groove portion and further assures against pulling in of air, it brings about quality grinding operation free of clogging up and/or scorch.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A grinding fluid feeder apparatus for a grinding machine for machining a spiral bevel gear in which a tapered annular grinding portion is formed of conical grinding faces provided on the inner and outer circumferences of an annular grinding wheel and a tooth surface of a workpiece is ground by said conical grinding faces, said grinding fluid feeder apparatus comprising:

a feeder block having a groove portion allowing the annular grinding portion to sink thereinto and a sump provided on a side surface of the groove portion;

a grinding fluid feed passage communicating with the groove portion; and, a cover plate provided at one of the openings of the groove portion on an end surface of the feeder block so as to abut on the annular grinding portion, wherein said feeder block is disposed to have the other of the openings of the groove portion abut on a tooth space of the workpiece.

2. A grinding fluid feeder apparatus according to claim 1, wherein said tapered annular grinding portion of said grinding wheel has radial oil passages therethrough and wherein said grinding fluid feed passage enters said groove portion on a side opposite said sump.

3. A grinding fluid feeder apparatus according to claim 1, wherein said cover plate has defined therein a groove closely matching said tapered annular grinding portion in profile so as to form a sealing portion.

* * * * *